(12) United States Patent
Starken

(10) Patent No.: US 6,986,497 B1
(45) Date of Patent: Jan. 17, 2006

(54) THRUSTER GAS CONTROL MECHANISM

(75) Inventor: George M. Starken, Rock Hall, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 44 days.

(21) Appl. No.: 10/857,377

(22) Filed: May 27, 2004

(51) Int. Cl.
*F16K 31/122* (2006.01)
(52) U.S. Cl. .................................. 251/30.02; 251/63
(58) Field of Classification Search ............ 251/30.01, 251/30.02, 62, 63
See application file for complete search history.

(56) References Cited

U.S. PATENT DOCUMENTS

| | | | | |
|---|---|---|---|---|
| 4,826,104 A | * | 5/1989 | Bennett et al. ............ | 244/3.22 |
| 5,117,868 A | * | 6/1992 | Wagner .................... | 137/625.6 |
| 5,150,879 A | | 9/1992 | Mullally ................. | 251/129.21 |
| 5,240,041 A | * | 8/1993 | Garnjost ................. | 137/625.62 |
| 5,328,147 A | * | 7/1994 | Stobbs ..................... | 251/30.02 |
| 5,697,401 A | * | 12/1997 | Shinoda et al. ......... | 137/625.62 |
| 5,979,862 A | * | 11/1999 | Wolfges ................... | 251/30.01 |
| 6,227,247 B1 | | 5/2001 | Abel ..................... | 137/625.62 |
| 6,233,919 B1 | | 5/2001 | Abel .......................... | 600/204 |
| 6,315,266 B1 | * | 11/2001 | Hirota et al. ............ | 251/30.01 |
| 6,390,199 B1 | | 5/2002 | Heinen ..................... | 166/319 |

\* cited by examiner

*Primary Examiner*—John Bastianelli
(74) *Attorney, Agent, or Firm*—John Tarlano

(57) ABSTRACT

A thruster gas control mechanism for controlling a flow of thrust gas through a gas nozzle, the mechanism having a plunger movable into and out of the gas nozzle, the plunger being connected to two movable baffles. The two baffles form two channels with two side walls of the mechanism. A movable armature controls flow of other thruster gas through either of the two channels, or through both channels, to cause the baffles and plunger to move toward or away from the gas nozzle, and causing the plunger to move into or out of the gas nozzle.

3 Claims, 3 Drawing Sheets

THRUSTER GAS CONTROL MECHANISM

U.S. Pat. No. 6,227,247 discloses a thruster gas valve. The thruster gas valve of the '247 patent has a piston. Thruster gas is caused to flow through two relatively small orifices that are located within the piston. A head portion of the piston moves into or out of an inlet of a gas nozzle, as a result of any change in an amount of gas that flows through each of the two orifices. The orifices can easily clog.

The present invention is a thruster gas control mechanism. The thruster gas control mechanism has a piston. The piston is located between two relatively large channels. The piston has a first baffle and a second baffle. The two baffles are parts of the two channels. Thruster gas is passes through one channel or the other channel, or through both channels. Thruster gas is not passed through the piston. The two channel will not easily clog.

In a first use of the invention, thruster gas is passed through either a first channel or a second channel by an armature, to cause the plunger to completely open or completely close a throat of a nozzle of a missile. The thruster gas in the first channel passes over only the first baffle, or thruster gas in the second channel passes over only the second baffle. Thruster gas is passed either through only an upstream end of the first channel or through only an upstream end of the second channel. When thruster gas is passed through only the first channel, the second baffle blocks a downstream end of the second channel. When thruster gas passes through only the second channel, the first baffle blocks a downstream end of the first channel.

In a second use of the invention, thruster gas is passed through both the first channel and the second channel, to cause the plunger to partially open a throat of the nozzle of the missile. Thruster gas is passed through both an upstream end of the first channel and an upstream end of the second channel by the armature. Thruster gas, that is passing through both channels, passes over both baffles. An equal force is produced on each of the two baffles by the thruster gas, due to a differential constriction of the downstream ends of the two channels by the two baffles. The equalization of force on the two baffles causes the plunger to partially open the throat of the nozzle. In the second embodiment, as thruster gas passes through the first channel, the second baffle partially blocks the downstream end of the second channel; as thruster gas passes through the second channel, the first baffle partially blocks the downstream end of the first channel.

SUMMARY OF THE INVENTION

A thruster gas control mechanism comprising a shell, the shell having opposing walls, the opposing walls being parallel to each other to form two parallel walls, the shell having a gas entrance, a gas exit, a parallel wall of the shell having a plunger opening, the shell having a hollow interior, first and second supports within the hollow interior, two parallel baffles, the two baffles being able to slide between the first and second supports; a first channel being formed between an interior side of a first parallel wall and the first baffle and between a first side of each of the first and second supports, the first channel having an upstream end and a down stream end, a second channel being formed between an interior side of a second parallel wall and the second baffle, and between a second side of each of the first and second supports, the second channel having an upstream end and a down stream end, the first baffle being able to be positioned to close the downstream end of the first channel and the second baffle being able to be positioned to close the downstream end of the second channel, and a plunger passing through the two baffles and connected to the two baffles, the plunger also passing through the plunger opening of the shell, and an armature, the armature being able to be positioned to close the upstream end of the first channel and alternately being able to be positioned to close the upstream end of the second channel.

DESCRIPTION OF THE PREFERRED EMBODIMENT

Figure 1A:
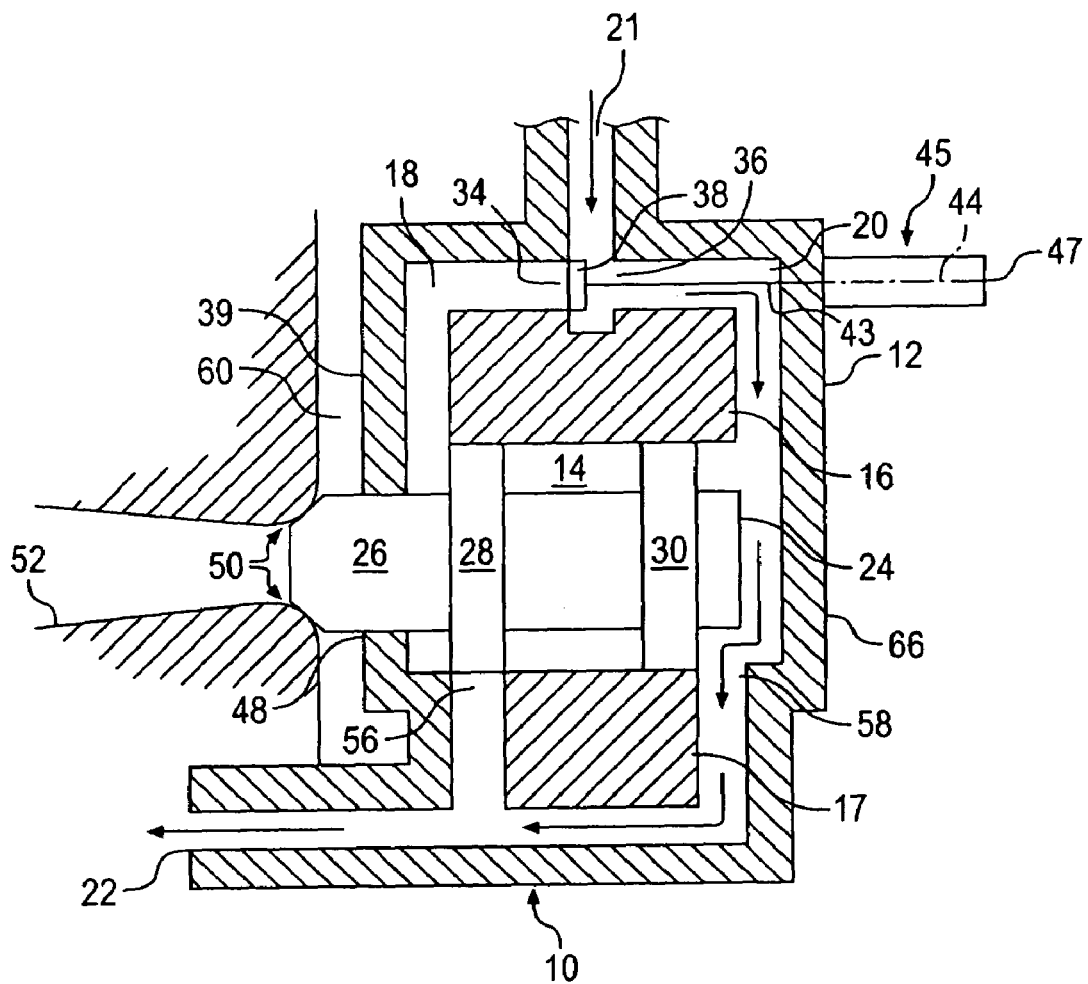
FIG. 1A is a front sectional view of a thruster gas control mechanism that has closed throat of a gas nozzle.

FIG. 1A shows a thruster gas control mechanism 10. The thruster gas control mechanism 10 has an outer shell 12. The outer shell 12 has a central void 14. The outer shell 12 houses an inner support 16 and an inner support 17. The inner support 16 and inner support 17 are located within the central void 14. The outer shell 12 has a thruster gas entrance 21 and a thruster gas exit 22.

The inner support 16 and inner support 17 do support a movable piston 24. The movable piston 24 is comprised of a plunger 26, a first baffle 28 and a second baffle 30. The inner support 16, first baffle 28, inner support 17 and outer shell 12, together, form a first channel 18. The inner support 16, second baffle 30, inner support 17 and outer shell 12 form a second channel 20. The first channel 18 has an upstream end 34 and a downstream end 56. The second channel 20 has a upstream end 36 and a downstream end 58.

An armature 38 is located between upstream ends 34 and 36. The armature 38 is moved by a solenoid 45, shown in FIG. 1B, to completely block upstream end 34, to completely block upstream end 36, or to partially block upstream ends 34 and 36.

Figure 1B:
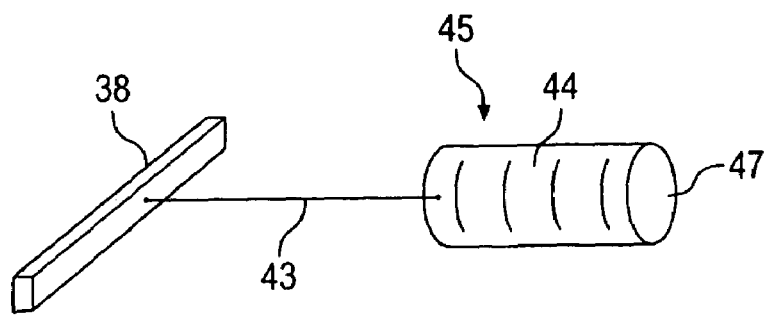
FIG. 1B is a front perspective view of an armature, solenoid rod and solenoid.

As shown in FIG. 1B, the armature 38 is connected to a solenoid rod 43. The armature 38 is moved toward or away from a solenoid body 44 of the solenoid 45. The armature 38 and rod 43 are moved by solenoid 45. The rod 43 is connect at a right angle to the armature 38.

As shown in FIG. 1A, the baffles 28 and 30 of the movable piston 24 can and do slide on the inner support 17 and slide on the inner support 16. The inner support 17 supports the baffles 28 and 30 of the movable piston 24.

The outer shell 12 has an outer wall 39. A wall 66 of outer shell 12 is parallel to wall 39 of the outer shell. Two other walls (not shown) are perpendicular to the walls 39 and 66. The not-shown two walls of outer shell 12 grip the inner support 16 and inner support 17, and theses walls prevent the inner supports 16 and 17 from moving within shell 12. The four walls of outer shell 12 are shaped at their top and bottom to form the thruster gas entrance 21 and thruster gas exit 22 of outer shell 12.

A hole 41 is located within wall 66. Rod 43 of solenoid 45 passes through the hole 41. The body 44 of solenoid 45 is connected to wall 66. The rod 43 is connected to armature 38, as shown in FIG. 1B. The solenoid 45 moves armature 38 toward or away from an end 47 of the solenoid 45.

The plunger 26, the first baffle 28 and the second baffle 30 all move in unison. The plunger 26, first baffle 28 and second baffle 30 are connected together for movement within the central void 14 of the outer shell 12.

As shown in FIG. 1A, some thruster gas is sent into thruster gas entrance 21 of thruster gas control mechanism 10. The armature 38 is positioned to block upstream end 34 of channel 18. The armature 38 is positioned to not block upstream end 36 of channel 20. Thruster gas pressure is placed on the second baffle 30, due to a flow of thruster gas through only the second channel 20.

In FIG. 1A, the movable baffle 30 is moved away from the second channel 20 due to thruster gas flowing over the second baffle 30. The plunger 26 moves through hole 48 in wall 39 of the outer shell 12. The plunger 26 closes a throat 40 of a gas nozzle 42, since gas pressure is applied to baffle 30, but not to baffle 28. Thus, when gas passes through channel 20, the gas pushes on baffle 30, causing the plunger 26 to go into and close the throat 50 of gas nozzle 52 of a missile (not shown). None of a large amount available thruster gas can flow through a channel 60 and out of nozzle 52. A rocket, that has a thruster gas control mechanism 10 in a configuration shown in FIG. 1, will not be propelled by thruster gas passing out of nozzle 52.

As shown in FIG. 1A, the baffle 28 blocks the downstream end 56 of the first channel 18. Since the armature 38 blocks the upstream end 34 of the first channel 18, gas passes through the second channel 20 and passes out of thruster gas exit 22.

Again, as shown in FIG. 1A, the armature 38 closes the upstream end 34 of the first channel 18 and allows some thruster gas to pass through the second channel 20, the gas pushing on the baffle 30 to cause plunger 26 to close the throat 50 of the gas nozzle 52. At this time, the baffle 28 closes the downstream end 56 of the first channel 18.

As shown in FIG. 1A, the baffle 28 closes the down stream end 56 of the channel 18, so that gas that passes through the channel 20 will not strike the baffle 28, which otherwise would cause baffle 28 to push the plunger 26 toward the second channel 20. The baffle 28 thus acts as a valve to close the channel 18 to a back flow of thruster gas.

Figure 2:
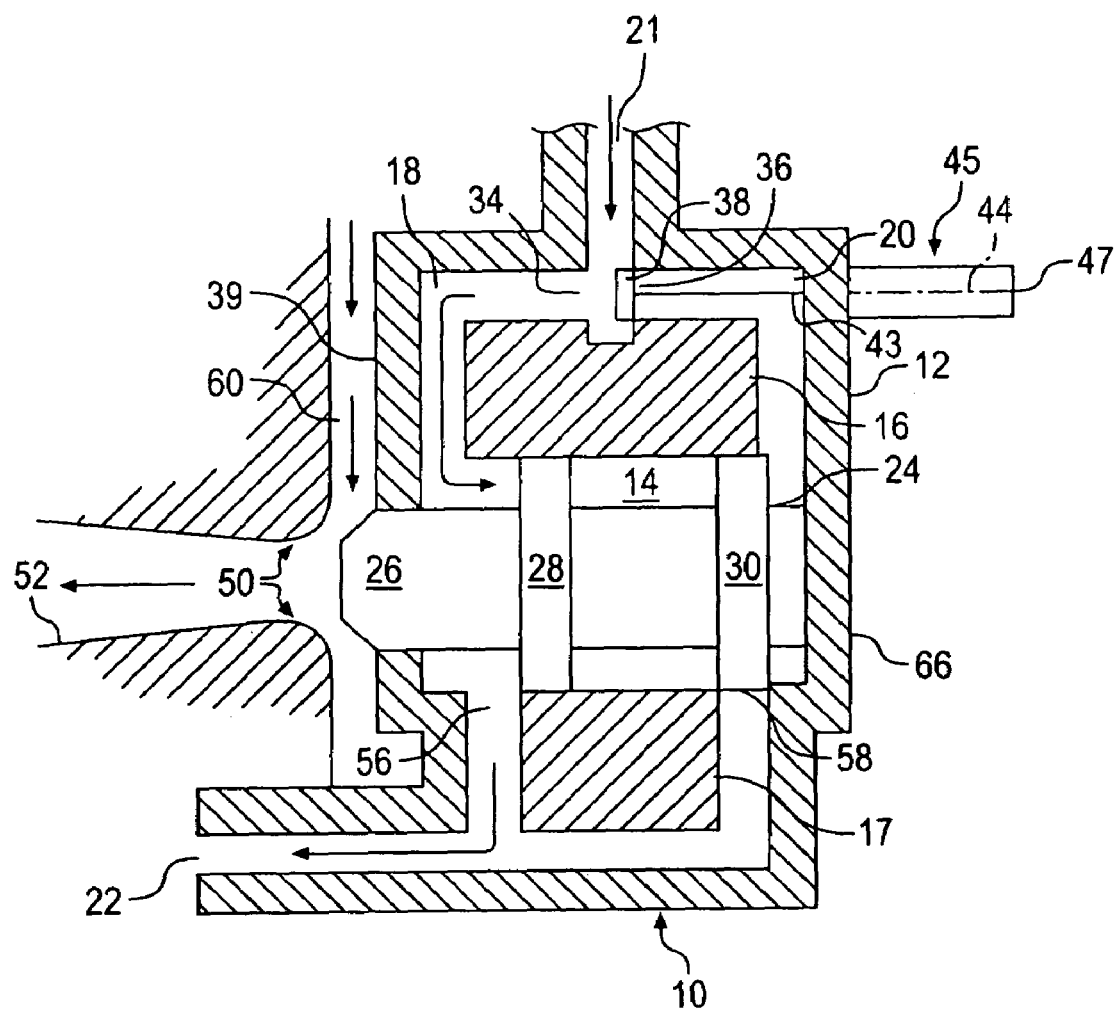
FIG. 2 is a front sectional view of a thruster gas control mechanism that has opened a throat of a gas nozzle.

In FIG. 2, the armature 38 is moved toward solenoid 45, to open the upstream end 34 of channel 18 and close upstream end 36 of channel 20. Thruster gas from gas entrance 21 flows through channel 18. The armature 38 has closed the thruster gas upstream end 36 of the second channel 20 to prevent a flow of thruster gas through channel 20. Thruster gas flows through first channel 18 and applies gas pressure to baffle 28. In FIG. 2, the armature 38 allows a flow of thruster gas into the first channel 18 but does not allow a flow of thruster gas into the second channel 20. Baffle 28 moves toward wall 66 of shell 12.

In FIG. 2, the plunger 26 opens throat 50 of gas nozzle 52, since gas pressure moves baffle 28 toward wall 66 of shell 12. Thus, when gas passes through channel 18, the gas pushes on baffle 28, causing the plunger 26 to come out of throat 50 of gas nozzle 52 of the missile(not shown).

As shown in FIG. 2, baffle 30 blocks the downstream end 58 of the second channel 20. Since the armature 38 blocks the upstream end 36 of the second channel 20, gas passes through the first channel 18 and passes out of exit 22.

FIG. 2 shows that the plunger 26 is located out of the throat 50 of the nozzle 52. A large amount of thruster gas passes through a channel 60, then across the throat 50 of the nozzle 52. The large amount of thruster gas passes out of the nozzle 52. The large amount of thruster gas propels the missile(not shown) that is connected to the nozzle 52.

Thus the positive displacement thruster gas flow control mechanism 10 of FIGS. 1A and 2 controls a flow of a large amount of hot thruster gas through a nozzle 52 by means of armature 38. Armature 38 is moved back and forth, or partially back and forth, between the end 34 of channel 18 and the end 36 of channel 20. The armature 38 is moved by solenoid 45.

As shown in FIG. 2, the baffle 30 closes the downstream end 58 of the second channel 20. Thus when gas passes into the channel 18, it will not flow into the channel 20 through the downstream end 58 of the channel 20. The baffle 30 thus acts as a valve to close the downstream end 58 of the channel 20 to the flow of gas. Therefore gas will not enter into the channel 20, to push on the baffle 30, to otherwise cause the plunger 26 to move toward the throat 40 of the gas nozzle 42.

Therefore the baffles 28 and 30 of the thruster gas control mechanism 10 each have a dual purpose of being surfaces upon which gas pushes, to either push the plunger 26 into the throat 40 of the nozzle 42 or pull the plunger 26 out of the throat 40 of the nozzle 42, while the baffles 28 and 30 also act as valves to close the downward ends 56 and 58 of the gas channels 18 and 20. The armature 38 is positioned to close an upstream end 34 of the first channel 18 or alternately to close an upstream end 36 of second channel 20. The armature 38 is activated by solenoid 45.

Again, as shown in FIG. 2, the baffle 28 closes the upstream end 36 of the channel 20. This closure allows gas to pass only through the first channel 18. This gas pushes on the baffle 28. As shown in FIG. 2, the baffle 30 has closed the downstream end 58 of the second channel 20. This closure prevents gas from passing from the first passage 18 in to the second passage 20.

Figure 3:
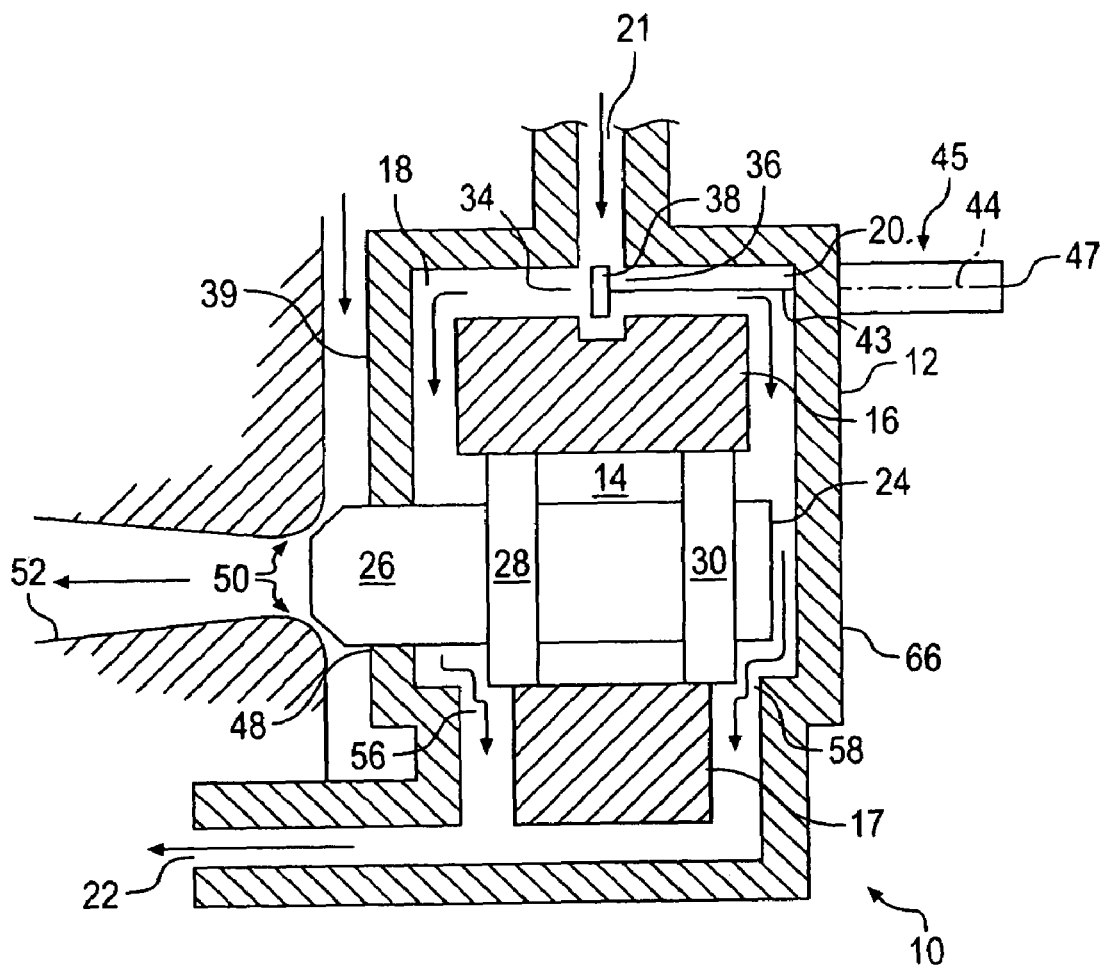
FIG. 3 is a front sectional view of a thruster gas control mechanism that has partially opened a throat of a gas nozzle.

In FIG. 3, thruster gas is sent into thruster gas entrance 21. The armature 38 partially blocks upstream end 34 of channel 18 and partially blocks upstream end 36 of channel 20. Thruster gas pressure is placed on both the first baffle 28 and second baffle 30, due to a flow of thruster gas through first channel 18 and through second channel 20. In FIG. 3, the movable baffle 30 has moved from a position shown in FIG. 2, toward nozzle 52, due to thruster gas flowing over the second baffle 30. The plunger 26 extends through a wall 39 of the outer shell 12. The plunger 26 partially closes throat 50 of gas nozzle 52, as more gas pressure is applied to baffle 30 than is applied to baffle 28. Thus, when gas passes through channels 18 and 20, the gas pushes on baffles 28 and 30, causing the plunger 26 to go partially into the throat 50 of gas nozzle 52 of a missile (not shown).

As shown in FIG. 3, baffle 28 partially blocks the downstream end 56 of the first channel 18 and baffle 30 partially blocks the downstream end 58 of the second channel 20 Since the armature 38 partially blocks the upstream end 34 of the first channel 18, and since the armature 38 partially blocks the upstream end 36 of the second channel 20, gas passes through the first channel 18 and second channel 20, and passes out of exit 22.

In FIG. 1A, since the armature 38 completely blocks the upstream end 34 of the first channel 18, gas passes through the second channel 20. In FIG. 2, since the armature 38 completely blocks the upstream end 36 of the second channel 20, gas passes through the first channel 18. In FIG. 3, since the armature 38 partially blocks the upstream end 34 of the first channel 18, gas passes through the second channel 20, and since the armature 38 partially blocks the upstream end 36 of the second channel 20, gas passes through the first channel 18.

While the present invention has been disclosed in connection with the preferred embodiment thereof, it should be understood that there may be other embodiments which fall within the spirit and scope of the invention as defined by the following claims.

What is claimed is:

1. A thruster gas control mechanism, comprising:
  (a) a shell, the shell having opposing walls, the opposing walls being parallel to each other to form two parallel walls, the shell having a gas entrance, a gas exit, a parallel wall of the shell having a plunger opening, the shell having a hollow interior;
  (b) first and second supports within the hollow interior;
  (c) two parallel baffles, the two baffles being able to slide between the first and second supports; a first channel being formed between an interior side of a first parallel wall and the first baffle and between a first side of each of the first and second supports, the first channel having an upstream end and a down stream end, a second channel being formed between an interior side of a second parallel wall and the second baffle, and between a second side of each of the first and second supports, the second channel having an upstream end and a down stream end, the first baffle being able to be positioned to close the downstream end of the first channel and the second baffle being able to be positioned to close the downstream end of the second channel;
  (d) a plunger passing through the two baffles and connected to the two baffles, the plunger also passing through the plunger opening of the shell; and
  (e) an armature, the armature being able to be positioned to close the upstream end of the first channel and alternately being able to be positioned to close the upstream end of the second channel.

2. A thruster gas control mechanism, comprising:
  (a) a shell, the shell having first and second parallel walls, the shell having a gas entrance and a gas exit;
  (b) first and second baffle supports, the first and second baffle supports being separated from the first and second parallel walls, a space between the first baffle support and a first parallel wall forming a portion of a first channel, a space between the second baffle support and the first parallel wall forming another portion of the first channel, a space between the first baffle support and the second parallel wall forming a portion of a second channel, a space between the second baffle support and the second parallel wall forming another portion of the second channel; the first and second channels being connected between the gas entrance and the gas exit, each of the first and second baffle supports having a smooth surface, the smooth surfaces being parallel to each other, the smooth surfaces being perpendicular to the parallel walls;
  (c) first and second baffles located between the smooth surfaces of the first and second baffle supports; the first and second baffles being spaced from the first and second parallel walls, a space between the first baffle and the first parallel wall forming a portion of the first channel and a space between the second baffle and the second parallel wall forming a portion of the second channel, the baffles being rectangular parallelepiped, the baffles having parallel sides, the parallel sides being perpendicular to the smooth surfaces; and
  (d) a plunger, the plunger being connected to the baffles, the plunger passing through the parallel sides of the baffles, a longitudinal axis of the plunger being perpendicular to the parallel walls, the plunger also passing through a parallel wall.

3. A thruster gas control mechanism, comprising:
  (a) a rectangular shell having a single gas entrance, a single gas exit, a plunger opening and a hollow central rectangular interior;
  (b) a central body within the hollow central rectangular interior, the central body comprising a first support and a second supports;
  (c) two parallel baffles, the two parallel baffle being between the first and second supports;
  (d) a plunger, the plunger passing through the two baffles,
  the central body and two baffles forming a first channel with a first interior side of the rectangular shell and forming a second channel with a second interior side of the rectangular shell, the first and second interior sides being opposite to each other, the plunger passing through the plunger opening of the rectangular shell, the first baffle being able to be positioned to close a downstream end of the first channel and the second baffle being able to be positioned to close a downstream end of the second channel; and
  (e) an armature being able to be positioned to partially close an entrance portion of the first channel and to partially close an entrance portion of the second channel.

* * * * *